(12) United States Patent
Yamamoto

(10) Patent No.: US 7,868,934 B2
(45) Date of Patent: Jan. 11, 2011

(54) IMAGE CAPTURING APPARATUS, CONTROL METHOD THEREFOR, PROGRAM, AND STORAGE MEDIUM FOR PROVIDING A LIMITED EXTRACTION RANGE OF A VIDEO IMAGE

(75) Inventor: Harushige Yamamoto, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 625 days.

(21) Appl. No.: 11/877,811

(22) Filed: Oct. 24, 2007

(65) Prior Publication Data
US 2008/0122951 A1 May 29, 2008

(30) Foreign Application Priority Data
Nov. 29, 2006 (JP) ............................. 2006-322525

(51) Int. Cl.
H04N 5/262 (2006.01)
(52) U.S. Cl. ................................. 348/240.2; 348/222.1
(58) Field of Classification Search ............. 348/208.6, 348/222.1, 240.1, 240.2, 333.01
See application file for complete search history.

(56) References Cited

U.S. PATENT DOCUMENTS 7,057,645 B1 * 6/2006 Hara et al. ............... 348/208.6
7,551,203 B2 * 6/2009 Nakayama et al. ....... 348/222.1
2008/0007643 A1 * 1/2008 Okumura ............... 348/333.01

FOREIGN PATENT DOCUMENTS

JP 2001-078081 3/2001

\* cited by examiner

Primary Examiner—Gevell Selby
(74) Attorney, Agent, or Firm—Cowan, Liebowitz & Latman, P.C.

(57) ABSTRACT

This invention can appropriately control the relationship between the electronic zoom magnification and the resolution of a displayed image in electronic zoom. An image capturing apparatus includes an image sensor which photo-electrically converts an image of an image sensing field formed by a photographing optical system, an extracting unit which extracts a part of the video image generated upon being photo-electrically converted by the image sensor, an adding unit which adds signals of respective pixels, the number of which corresponds to the luminance of the image sensing field, of a plurality of pixels of the image sensor, and a limiting unit which limits the extraction range of the video image extracted by the extracting unit, in accordance with the number of pixels added by the adding unit.

5 Claims, 6 Drawing Sheets

FIG. 3

| IMAGE CAPTURING CONDITION | FOCAL LENGTH IN QVGA EXTRACTION | NUMBER OF ADDED PIXELS | INCREASE IN STEP OF NUMBER OF ADDED PIXELS | ILLUMINANCE (lx) E | OBJECT LUMINANCE Bv | CCD SENSITIVITY | | EXPOSURE VALUE | | | | SHUTTER | |
|---|---|---|---|---|---|---|---|---|---|---|---|---|---|
| | | | | | | ISO | Sv | Ev | FNo | Av | Tv | SH SPEED 1/T | |
| VC IMAGE CAPTURING LIMIT | 31.06 | 64.0 | 6 | 1.0 | −6 | 800 | 8 | 8 | 2.80 | 3.0 | 5.0 | 33 |
| | 43.93 | 32.0 | 5 | 2.0 | −5 | 800 | 8 | 8 | 2.80 | 3.0 | 5.0 | 33 |
| | 62.13 | 16.0 | 4 | 4.0 | −4 | 800 | 8 | 8 | 2.80 | 3.0 | 5.0 | 33 |
| | 87.86 | 8.0 | 3 | 8.0 | −3 | 800 | 8 | 8 | 2.80 | 3.0 | 5.0 | 33 |
| | 124.25 | 4.0 | 2 | 16 | −2 | 800 | 8 | 8 | 2.80 | 3.0 | 5.0 | 33 |
| | 175.72 | 2.0 | 1 | 32 | −1 | 800 | 8 | 8 | 2.80 | 3.0 | 5.0 | 33 |
| | 248.50 | 1.0 | 0 | 64 | 0 | 800 | 8 | 8 | 2.80 | 3.0 | 5.0 | 33 |
| CANDLE | 248.50 | 1 | 0 | 127 | 1 | 800 | 8 | 9 | 2.80 | 3.0 | 6.0 | 65 |
| BRIGHT NIGHT VIEW | 248.50 | 1 | 0 | 255 | 2 | 800 | 8 | 10 | 2.80 | 3.0 | 7.0 | 131 |
| DARK ROOM | 248.50 | 1 | 0 | 509 | 3 | 800 | 8 | 11 | 2.80 | 3.0 | 8.0 | 261 |
| ROOM | 248.50 | 1 | 0 | 1019 | 4 | 400 | 7 | 11 | 2.80 | 3.0 | 8.0 | 261 |
| BRIGHT ROOM | 248.50 | 1 | 0 | 2037 | 5 | 200 | 6 | 11 | 2.80 | 3.0 | 8.0 | 261 |
| SHADE/CLOUDY WEATHER | 248.50 | 1 | 0 | 4075 | 6 | 100 | 5 | 11 | 2.80 | 3.0 | 8.0 | 261 |
| PARTLY CLOUDY WEATHER | 248.50 | 1 | 0 | 8150 | 7 | 50 | 4 | 11 | 2.80 | 3.0 | 8.0 | 261 |
| CLEAR WEATHER | 248.50 | 1 | 0 | 16299 | 8 | 50 | 4 | 12 | 2.80 | 3.0 | 9.0 | 522 |
| FINE WEATHER | 248.50 | 1 | 0 | 32599 | 9 | 50 | 4 | 13 | 2.80 | 3.0 | 10.0 | 1045 |
| FINE WEATHER IN SUMMER | 248.50 | 1 | 0 | 65198 | 10 | 50 | 4 | 14 | 2.80 | 3.0 | 11.0 | 2090 |

IMAGE CAPTURING APPARATUS, CONTROL METHOD THEREFOR, PROGRAM, AND STORAGE MEDIUM FOR PROVIDING A LIMITED EXTRACTION RANGE OF A VIDEO IMAGE

BACKGROUND OF THE INVENTION

1. Field of the Invention

The present invention relates to an electronic zoom function of extracting a part of an object image formed by an image sensor and displaying or recording it on a recording medium.

2. Description of the Related Art

There has conventionally been known an image capturing apparatus having a so-called electronic zoom function of extracting a part of an object image formed by an image sensor and displaying or recording it on a recording medium.

Japanese Patent Laid-Open No. 2001-078081 discloses a known image capturing apparatus having such an electronic zoom function.

The image capturing apparatus disclosed in Japanese Patent Laid-Open No. 2001-078081 comprises a first reading means for adding n (n: natural number) pixels for pixels in a first imaging area 201 and reading out the resultant pixels. This apparatus also comprises a second reading means for not adding or adding m (m<n; m: natural number) pixels for pixels in a second imaging area 202 narrower than the first imaging area 201 and reading out the resultant pixels. This arrangement allows display that does not make the photographer uncomfortable by setting the same resolution in enlarged display and normal display on a display means.

Unfortunately, the above-described conventional technique merely maintains the display quality constant by adding n pixels in a wide display range and not adding or adding m pixels fewer than n pixels in a narrow display range. That is, since this technique does not take the object illuminance into consideration in adding pixels, the relationship between the electronic zoom magnification and the number of added pixels corresponding to the object illuminance still remains to be improved. That is, as the object illuminance decreases and the number of added pixels increases, the resolution of an image lowers if the electronic zoom magnification is raised carelessly.

SUMMARY OF THE INVENTION

The present invention has been made in consideration of the above-described problem, and has as its object to make it possible to appropriately control the relationship between the electronic zoom magnification and the resolution of a displayed image in electronic zoom.

In order to solve the above-described problem and to achieve the above-described object, according to the first aspect of the present invention, there is provided an image capturing apparatus comprising an image sensor which photo-electrically converts an image of an image sensing field formed by a photographing optical system, an extracting unit which extracts a part of the video image generated upon being photo-electrically converted by the image sensor, an adding unit which adds signals of respective pixels, the number of which corresponds to a luminance of the image sensing field, of a plurality of pixels of the image sensor, and a limiting unit which limits an extraction range of the video image extracted by the extracting unit, in accordance with the number of pixels added by the adding unit.

According to the second aspect of the present invention, there is provided a method of controlling an image capturing apparatus including an image sensor which photo-electrically converts an image of an image sensing field formed by a photographing optical system, the method comprising an extracting step of extracting a part of the video image generated upon being photo-electrically converted by the image sensor, an adding step of adding signals of respective pixels, the number of which corresponds to a luminance of the image sensing field, of a plurality of pixels of the image sensor, and a limiting step of limiting an extraction range of the video image extracted in the extracting step, in accordance with the number of pixels added in the adding step.

Further features of the present invention will become apparent from the following description of exemplary embodiments with reference to the attached drawings.

BRIEF DESCRIPTION OF THE DRAWINGS

FIG. 3 is a table showing an example of the relationship between the object illuminance and the electronic zoom focal length in QVGA extraction;

DESCRIPTION OF THE EMBODIMENT

A preferred embodiment of the present invention will be described in detail below with reference to the accompanying drawings.

Figure 1:
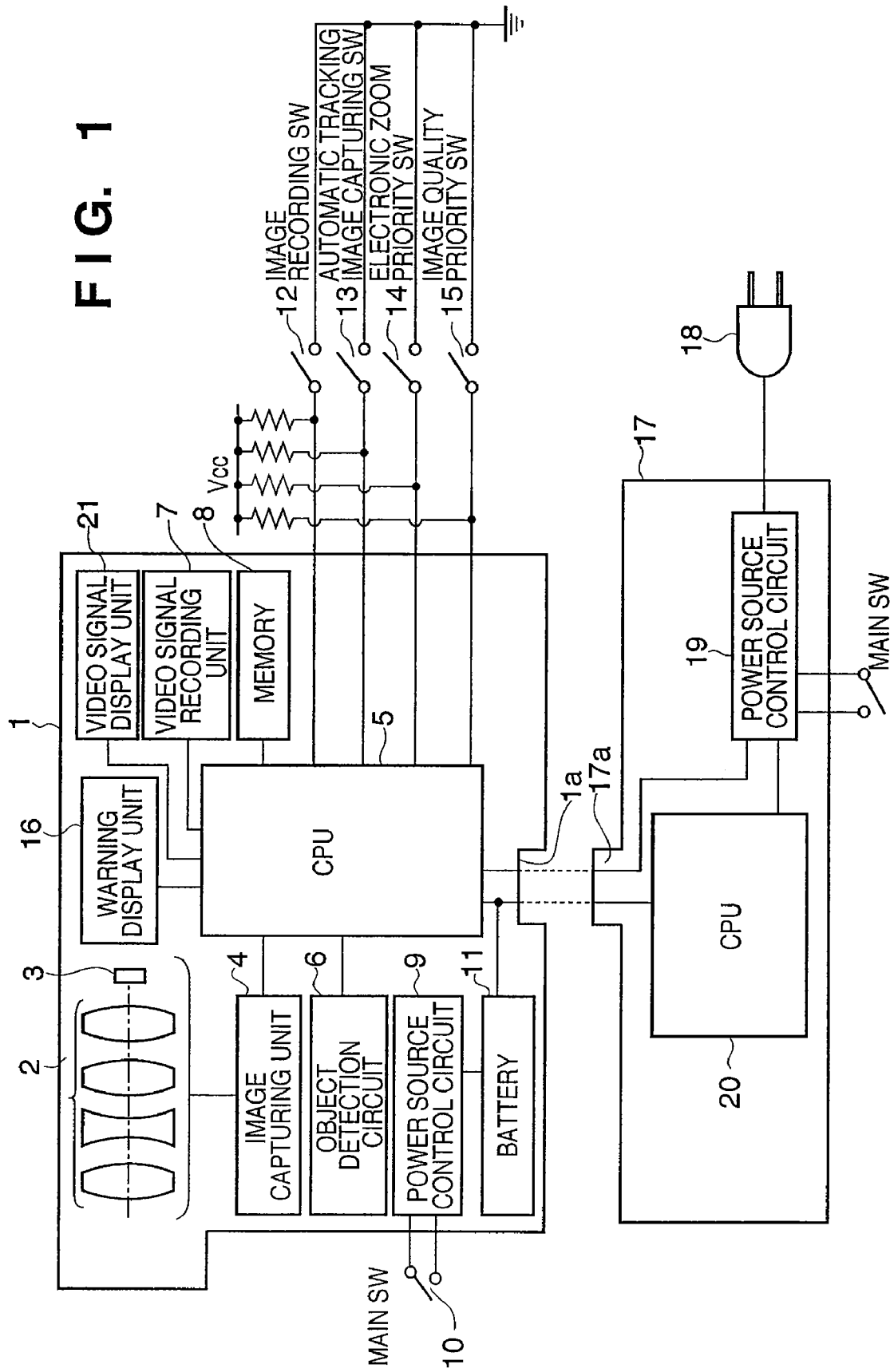
FIG. 1 is a block diagram showing the main part of an image capturing apparatus according to an embodiment of the present invention.

FIG. 1 is a block diagram showing the main part of an image capturing apparatus according to the embodiment of the present invention. This block diagram also shows that the image capturing apparatus connects to a charging cradle 17.

An image capturing apparatus 1 incorporates a photographing optical system 2 for forming an object image. An image capturing unit 4 receives a video signal from an image sensor 3 including, for example, a CCD for photo-electrically converting the object image. The video signal received by the image capturing unit 4 is output to an object detection circuit 6 via a CPU 5. The object detection circuit 6 detects the object motion based on the video signal, and sends the detected information to the CPU 5 again. The CPU 5 executes a tracking determination process (to be described later), and captures an enlarged image of the object using electronic zoom while tracking him/her.

A video signal recording unit 7 records captured video data in, for example, a known magnetic tape, hard disk, or non-volatile solid-state memory.

A memory 8 temporarily stores various kinds of data containing the above-described video signal such as an object detection video signal.

A power source control circuit 9 receives electric power from a battery 11 as a main SW (switch) 10 is turned on, and supplies it to the CPU 5. The power source control circuit 9 also supplies electric power to a known scaling mechanism and focusing mechanism of the photographing optical system 2. In recording captured data on a magnetic recording tape as an image recording SW (switch) 12 is turned on, the power source control circuit 9 also supplies electric power to a take-up driving source of the magnetic recording tape.

An automatic tracking image capturing SW (switch) 13 is used to set the photographing optical system 2 on a wide-angle (WIDE) side as the image capturing apparatus 1 is set to an automatic tracking mode. In this case, the image capturing apparatus 1 captures a moving object while zooming up and tracking him/her using electronic zoom.

An electronic zoom priority SW (switch) 14 allows image capturing while zooming up to the degree that the magnification exceeds the limit value of an electronic zoom focal length defined by the illuminance of an image sensing field. A warning display unit 16 displays or notifies that an image will be captured at a magnification that exceeds the limit value.

An image quality priority SW (switch) 15 is turned on to execute the following process. That is, when the electronic zoom priority SW is turned on while the above-described automatic tracking mode is set, an image is captured while zooming up to the degree that the magnification exceeds the limit value of an electronic zoom focal length defined by the illuminance of an image sensing field. In order to limit pixel addition to prioritize the image quality, image capturing is performed by decreasing the shutter speed, that is, the frame rate in moving image capturing.

As will be described later, the warning display unit 16 issues a warning by turning on, for example, an LED or using a sound produced by a speaker to call photographer's attention, in accordance with the setting state of the image capturing apparatus, for example, in accordance with the setting states of the SWs 12, 13, 14, and 15.

A connector 17a of the charging cradle 17 connects to a connector 1a of the image capturing apparatus 1 so that the charging cradle 17 supplies electric power to the image capturing apparatus 1 and exchanges various control data with it.

An external power source plug 18 connects to a household power source (not shown) to supply external electric power to a power source control circuit 19. The electric power supplied to the power source control circuit 19 is also supplied to the battery 11 of the image capturing apparatus 1 via the connector 17a to charge the battery 11.

A CPU 20 is activated upon receiving the electric power output from the power source control circuit 19, and exchanges control data with the CPU 5 of the image capturing apparatus 1.

An electronic zoom operation for capturing an enlarged image of an object by determining and automatically tracking the object motion while the image capturing apparatus 1 is set on the charging cradle 17 will be explained next.

Figure 2:
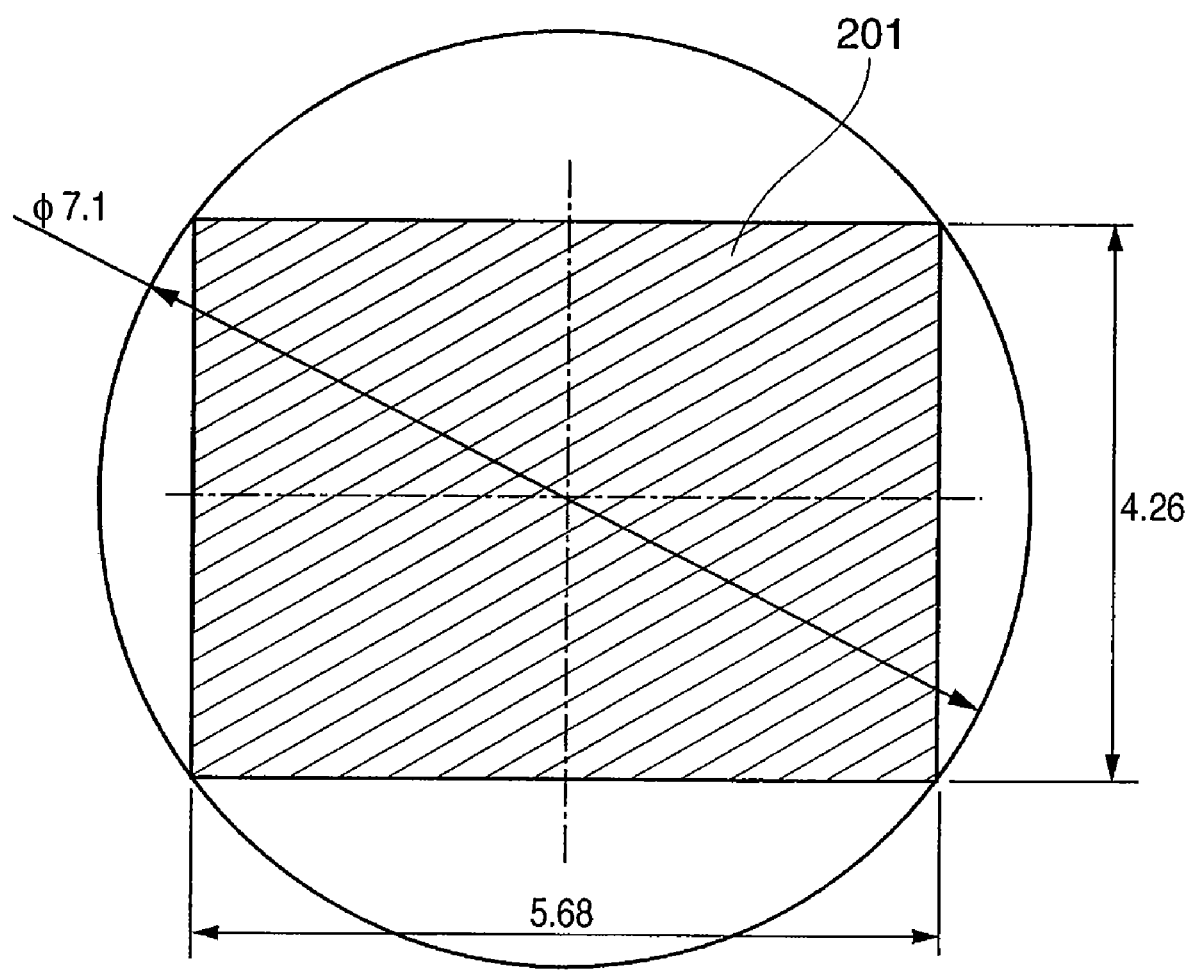
FIG. 2 is a view showing a CCD used as an image sensor of the image capturing apparatus according to the embodiment of the present invention.

FIG. 2 is a view showing a CCD 201 used as the image sensor 3 according to this embodiment. For easy understanding, certain numerical values are applied to, for example, the specifications of the CCD 201 and photographing optical system 2.

If the CCD 201 shown in FIG. 2 is assumed to have a size of ½.5 inches, its image circle has a diameter of φ7.1 mm. In this case, if the screen has an aspect ratio of 4:3, the long side has a dimension of 5.68 mm while the short side has that of 4.26 mm. This image sensor is assumed to be a CCD having six million pixels here. The use of this CCD allows electronic pan and tilt image capturing using electronic zoom while maintaining the photographing lens in a wide-angle state during moving image capturing, in addition to still image capturing.

An electronic tilt image capturing method using electronic zoom in a moving image capturing mode will be explained.

The cell size (the size of each pixel) of a CCD having six million pixels, a size of ½.5 inches, and an aspect ratio of 4:3 is calculated in the following way. Assuming that the cell shape is a square having a side length X, $$6 \times 10^6 = (5.68/X) \times (4.26/X)$$

and we have:

$$X = \sqrt{(5.68 \times 4.26 / 6 \times 10^6)} = 2.0 \, \mu m \quad (1)$$

A focal length f of the photographing optical system applied to this embodiment is defined by:

$$f = 28 \text{ mm to } 112 \text{ mm (F-number: 2.8 to 4.3)} \quad (2)$$

Assuming that the limit of extraction using electronic zoom is QVGA, a focal length fQVGA at which extraction is possible is approximately:

$$fQVGA = \{5.68/(320 \times 2.0)\} \times 28 = 248.5 \text{ mm} \quad (3)$$

Note that the resolution of QVGA is 240×320 pixels.

It is also an object of this embodiment to provide a monitoring camera function as a home security application, so the image capturing range at the above-described focal length must be considered. A horizontal field angle corresponding to f=28 mm is given by:

$$\theta = 2 \cdot \tan^{-1}(18/28) = 65.5° \quad (4)$$

If a camera is set at the corner of a room to capture the entire room, a horizontal field angle of 90° is necessary. This amounts to requiring an ultra-wide-angle lens having a focal length of 18 mm by simple arithmetic. In general, a demand for a zoom lens having a minimum focal length of 18 mm at the wide-angle end is poor from the viewpoint of the use frequency. Hence, a reasonable minimum focal length of ordinary cameras is f=28 mm.

The horizontal field angle calculated by equation (4) is narrower than 90° by 24.5°, which is equally distributed to left and right field angles of 12.25°. In this case, the field angle is wide enough to capture a suspicious person who enters from, for example, a window or door while a camera is set at the corner of a room. For example, a dead zone 5 m ahead falls within about 1 m with respect to a field angle (dead zone) of 12.25°. That is, a suspicious person who has forced his/her way into the room cannot carry out all the planned illegal activities within a one-side dead zone of 12.25° of the image capturing apparatus, that is, within about 1 m in a dead zone 5 m ahead. In other words, this image capturing apparatus can attain a sufficient monitoring function. It is also possible to cover a sufficient image capturing range even in tracking image capturing by automatic moving object recognition.

An image capturing range extracted at the above-described QVGA in an image sensing field 5 m ahead is given by:

$$\text{(short side)} = (5000/248.5) \times 24 = 483 \text{ mm} \quad (5)$$

$$\text{(long side)} = (5000/248.5) \times 36 = 724 \text{ mm} \quad (6)$$

That is, a closeup image of a person 5 m ahead can also be captured. Using this fact, a daily sight of family members in a room can be automatically captured while tracking them. It is also possible to capture a closeup image of the face of a suspicious person, who has forced his/her way into a room, to ensure home security.

The above-described image capturing can be performed without any problem when the object has a normal illuminance. However, a problem is posed when a low-illuminance object is to be captured to ensure home security.

It is the main object of this embodiment to take various measures against this problem, and a detailed description thereof will be made below.

A recently known image capturing technique using a digital camera performs image capturing with a higher sensitivity by adding up cells (pixels) of an image sensor and processing information on a plurality of cells as information on one cell when the luminance of an image sensing field is low. This technique is so-called sensitization image capturing by a pixel addition process.

This pixel addition process adds up some pieces of cell information into one and hence yields a result equivalent to that obtained by decreasing the number of pixels of the image sensor. For example, if two pixels are added in both the vertical and horizontal directions, the light-receiving area increases to four times, thus increasing the sensitivity in two steps ($2^2=4$ times). However, this case amounts to image capturing using a CCD having cells with a side length increased to twice. The number of pixels is therefore ¼ that of the origin.

In this embodiment, a range extracted using electronic zoom in accordance with the number of added pixels is regulated. This makes it possible to suppress a decrease in display resolution while image capturing with appropriate exposure even for a dark object.

When P pixels are added to obtain appropriate exposure for a certain object, an electronic zoom focal length fQVGA for image capturing by QVGA extraction assuming that the film length is 35 mm is given by:

$$fQVGA=[5.68/\{(\sqrt{P})\times 2.0\times 10^{-3}\times 320\}]\times f \quad (7)$$

where P is the number of added cells, and f is the focal length of the photographing lens.

Letting Ad be the increase in the number of exposure steps by pixel addition, since we have $$Ev=Bv+Sv+Ad=Av+Tv \quad (8)$$

the relationship between Ad and P in equation (7) satisfies:

$$P=2^{Ad}=2^{(Av+Tv-Bv-Sv)} \quad (9)$$

Since the numerical aperture Av, time Tv, and illuminance E are given by:

$$Av=2\cdot\log FNo/\log 2 \quad (10)$$

$$Tv=\log(1/T)/\log 2 \quad (11)$$

$$E=(0.32\times 11.4\times 2^{Bv})\times\pi/0.18 \text{ (lx)} \quad (12)$$

the luminance Bv and sensitivity Sv are:

$$Bv=\log[\{0.18/(\pi\times 0.32\times 11.4)\}\times E]/\log 2 \quad (13)$$

$$Sv=\log(0.32\times ISO)/\log 2 \quad (14)$$

where FNo in equation (10) is the minimum F-number of the photographing lens, (1/T) in equation (11) is the shutter speed which corresponds to the frame rate in moving image capturing and is generally (1/30) sec, and ISO in equation (14) is the ISO sensitivity of a silver halide film which corresponds to the light-receiving sensitivity of the CCD.

Using the above-described equations makes it possible to calculate the electronic zoom focal length at which extraction up to QVGA is possible when sensitization image capturing is performed by the pixel addition process at a certain object illuminance.

An enlarged image of the object is captured using electronic zoom while tracking him/her while the above-described relational expressions are satisfied.

FIG. 3 is a table showing an example of the relationship between the object illuminance and the electronic zoom focal length in QVGA extraction.

Moving image capturing requires no pixel addition process when the illuminance is equal to or higher than 64 and is performed while decreasing the ISO sensitivity (CCD gain) and adjusting the amount of light using a known ND filter. In this case, the electronic zoom focal length at which QVGA extraction is possible is 248.5 mm.

When the object illuminance becomes lower than 32 lx, image capturing is performed with appropriate exposure by the image addition process. The electronic zoom focal length at which QVGA extraction is possible then gradually decreases. When the illuminance becomes 1 lx, this length becomes nearly equal to 31 mm and therefore image capturing while zooming up becomes practically impossible.

Figure 4:
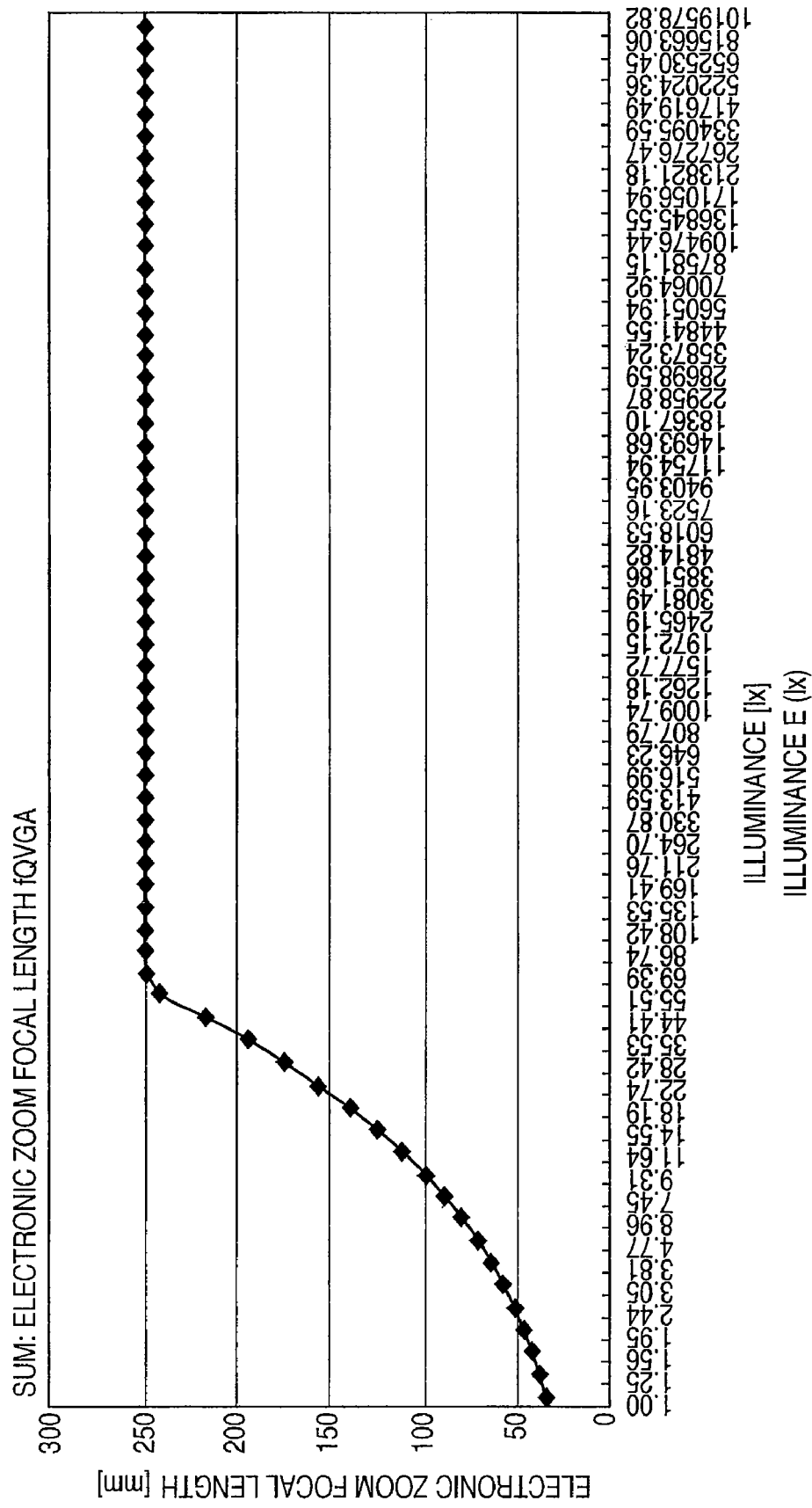
FIG. 4 is a graph expressing the relationship between the object illuminance and the electronic zoom focal length.

FIG. 4 is a graph expressing the relationship between the object illuminance and the electronic zoom focal length.

As described above, appropriate exposure control can be executed even for a dark object in the following way. That is, a pixel addition process corresponding to the illuminance of an image sensing field is executed. At the same time, the limit value of the electronic zoom focal length at which image capturing is performed by QVGA extraction is determined, and image capturing control for regulating the determined limit value is executed. It is also possible to suppress a decrease in display resolution.

A control sequence for determining the object motion to perform tracking image capturing will be explained with reference to FIG. 5.

Figure 5:
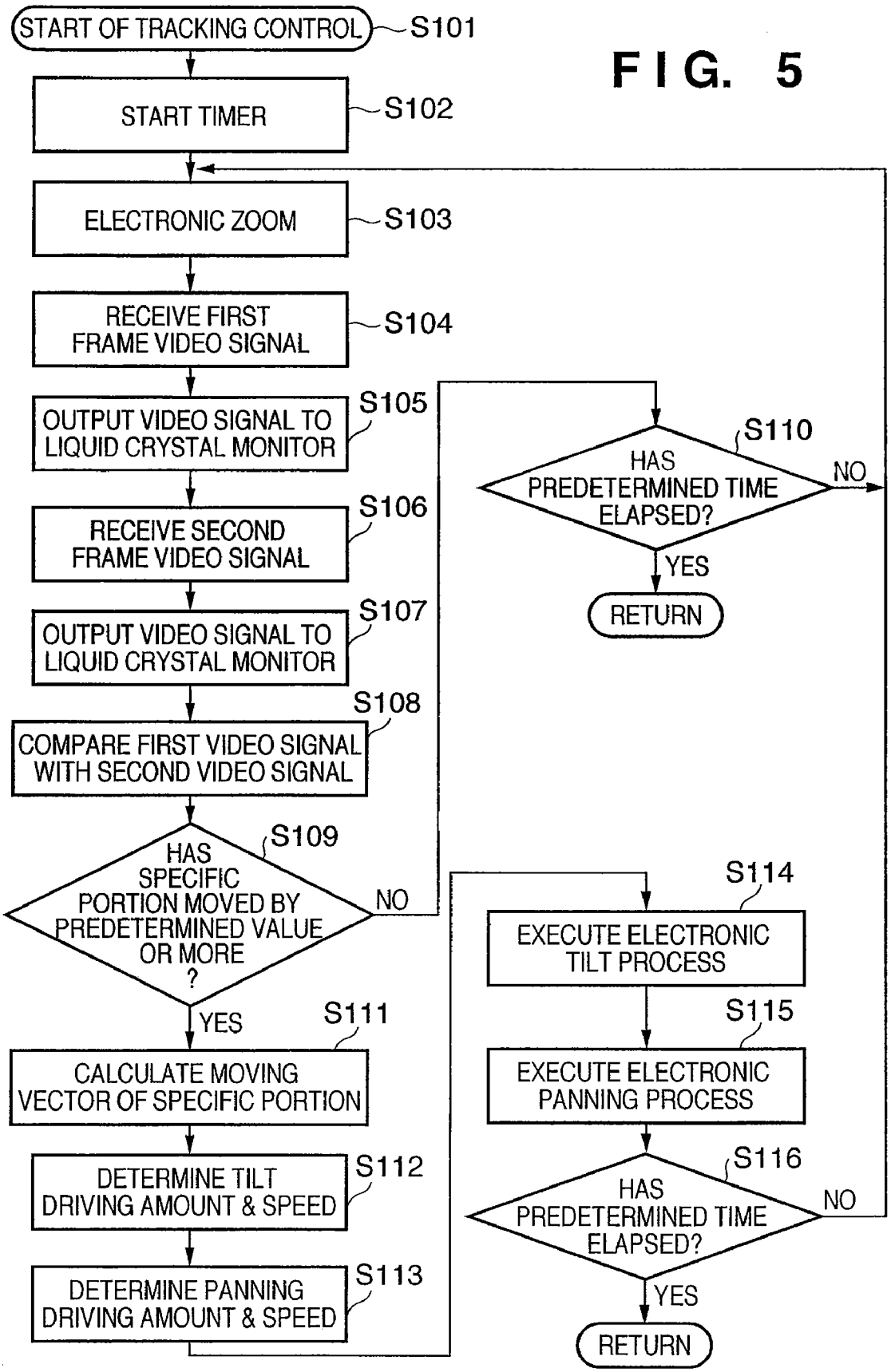
FIG. 5 is a flowchart illustrating a tracking control subroutine indicating an object determination method for tracking image capturing.

FIG. 5 is a flowchart illustrating a tracking control subroutine indicating an object determination method for tracking image capturing.

First, the subroutine process starts in step S101. In step S102, a timer is initialized and starts.

Next, a process (to be described later) for electronic zoom image capturing is executed in step S103.

After the subroutine in step S103, a first frame video signal is received and video data is recorded in the memory 8 in step S104.

In step S105, the first frame video signal is output to a video signal display unit 21 which is attached to the image capturing apparatus 1 and includes a known liquid crystal monitor, to provide a monitoring image for the photographer.

In step S106, a second frame video signal is received and video data is stored in the memory 8. In step S107, the video signal is output to the video signal display unit 21 to the video signal display unit 21 as in step S105.

In step S108, the object detection circuit 6 compares the two video data received in steps S104 and S106.

It is checked in step S109 whether a specific portion of the object such as the eyes, mouth, or nose has moved by a predetermined range or more. If the amount of movement of the specific portion falls within the predetermined range, it is determined that the object has not moved. The process then advances to step S110. If a predetermined time has elapsed already, the process escapes from the subroutine and returns to the main processing routine. If the predetermined time has not elapsed yet, the process returns to step S103 again. The main processing routine is the same as the operation routine of the known image sensing apparatus, and a description thereof will be omitted.

If it is determined in the determination routine of step S109 that the amount of movement of the specific portion falls outside the predetermined range, the direction and velocity of movement of the specific portion are calculated in step S111.

In step S112, a tilt driving amount and tracking speed necessary for tracking image capturing are determined. In step S113, a panning driving amount and tracking speed necessary for tracking image capturing are determined.

In step S114, the CPU 5 executes an electronic tilt process. In step S115, the CPU 5 also executes an electronic panning process. That is, the electronic pan and tilt processes are executed by changing the extraction position at the electronic zoom focal length set in the subroutine of step S103, as needed, to capture the moving object while tracking him/her.

It is checked in step S116 whether a predetermined time has elapsed. If the predetermined time has not elapsed yet, the process returns to step S103. If the predetermined time has elapsed already, the process escapes from the subroutine and returns to the main processing routine.

Figure 6:
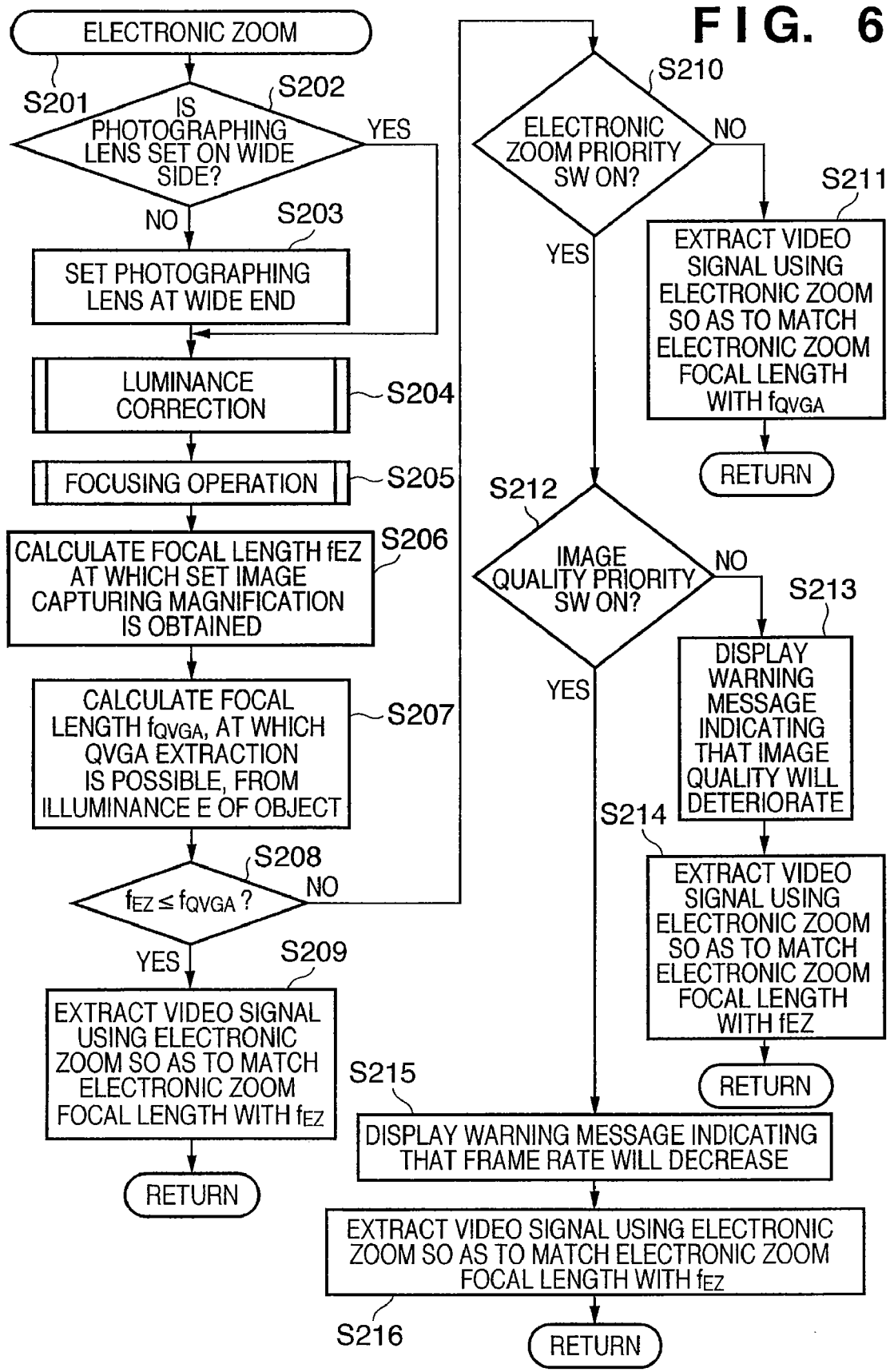
FIG. 6 is a flowchart illustrating an electronic zoom processing subroutine.

The electronic zoom process in the subroutine of step S103 will be explained with reference to FIG. 6.

In step S201, the electronic zoom processing subroutine starts. The photographing optical system 2 checks in step S202 whether the photographing optical system 2 is set at the wide-angle end (WIDE end). If the photographing optical system 2 is not set at the wide-angle end, it is set at the wide-angle end in step S203.

After that, luminance correction is executed in step S204. Although exposure control using a known IRIS stop or ND filter is executed to maintain an appropriate amount of exposure for a high-luminance object, a detailed description thereof will be omitted.

In step S205, the image capturing apparatus executes a focusing operation using a known method. For example, AF (autofocus) using a so-called contrast detection scheme is executed. This scheme drives focusing lenses in a predetermined direction to identify a change in the contrast value of an obtained object image, thereby controlling the driving of the focusing lenses so as to maximize that contrast value.

When control until step S205 is complete, an electronic zoom focal length fEZ at which the object is captured at a predetermined magnification, that is, the extraction range is calculated using electronic zoom in step S206. This focal length is given by:

$$fEZ = \beta^* x \quad (15)$$

where $\beta$ is the image capturing magnification, and x is the object distance.

In step S207, a necessary number of pixels to be added is calculated from the current object illuminance. Based on the calculated value, the focal length fQVGA in QVGA extraction is calculated. The focal length fQVGA can be calculated by applying appropriate parameters to equations (7) to (14), as described above.

In step S208, the thus obtained fEZ and fQVGA are compared. If fEZ≦fQVGA, the focal length in extraction using electronic zoom is set at fEZ and extraction is performed, and then the process escapes from the subroutine for the following reason. Since a pixel addition process based on, for example, the object illuminance, ISO sensitivity, and frame rate increases the apparent pixel size, the electronic zoom focal length at which QVGA extraction is possible changes. However, an extraction size calculated from an image capturing magnification necessary for automatic tracking image capturing, that is, the electronic zoom focal length fEZ takes a relatively small value, that is, is the one on the wide-angle side. This makes it possible to obtain appropriate exposure while ensuring a necessary image capturing magnification.

By contrast, control when appropriate exposure cannot be obtained while ensuring a necessary image capturing magnification will be described below.

It is checked in step S210 whether the electronic zoom priority SW 14 shown in FIG. 1 is ON. If the electronic zoom priority SW 14 is OFF, in step S211 the extraction range is so determined as to match the electronic zoom focal length with fQVGA to make settings for electronic zoom image capturing. Then, the process escapes from the subroutine for the following reason. When electronic zoom is so performed as to obtain a necessary image capturing magnification (match the electronic zoom focal length with fEZ), the resolution becomes lower than QVGA. Accordingly, settings are so made as to perform image capturing at the electronic zoom focal length fQVGA at which QVGA image capturing is possible. This allows image capturing with appropriate exposure while maintaining a resolution of QVGA, even though the object is captured at an image capturing magnification smaller than a predetermined one.

If it is determined in step S210 that the electronic zoom priority SW 14 is ON, whether the image quality priority SW 15 shown in FIG. 1 is ON is checked in step S212. If the image quality priority SW 15 is OFF, in step S213 the warning display unit 16 shown in FIG. 1 issues a warning that an image will be captured at a resolution lower than QVGA from now. In step S214, the extraction range is so determined as to match the focal length in extraction using electronic zoom with fEZ to make settings for electronic zoom image capturing. Then, the process escapes from the subroutine.

If it is determined in step S212 that the image quality priority SW 15 is ON, in step S215 the warning display unit 16 shown in FIG. 1 issues a warning that an image will be captured at a lower frame rate from now. In step S216, the extraction range is so determined as to match the focal length in extraction using electronic zoom with fEZ to make settings for electronic zoom image capturing. Then, the process escapes the subroutine. Image capturing is controlled by setting the frame rate (shutter speed) at this time such that fQVGA in the above-described equations (7) to (14) becomes equal to fEZ in equation (15). This makes it possible to obtain a moving image with appropriate exposure while ensuring a necessary image capturing magnification in accordance with the object distance, even though the frame rate, that is, shutter speed changes.

As described above, to allow the image capturing apparatus according to this embodiment function as, for example, a home security monitoring camera while setting it on the charging cradle, the photographer manipulates the setting SWs in advance to acquire a desired function. This makes it possible to utilize this camera to, for example, monitor the inside of a room.

Although an embodiment of the present invention has been described in detail above, the present invention is not limited to the contents of the above-described embodiment and can take any form without departing from the spirit and scope of the present invention.

In addition to the above-described setting SWs (switches) manipulated by the photographer, it is possible to set an automatic mode to perform image capturing while selecting the function of each image capturing mode according to circumstances. For example, when a suspicious person forces in his/her way into a room at night, first, his/her moving image is captured with appropriate exposure at QVGA and 30 frames/sec by the pixel addition process. Next, if this person is moving more slowly than a predetermined value, his/her enlarged image can be captured at the cost of the frame rate. If this person begins to move more quickly than the predetermined value, his/her closeup image can also be captured at the cost of resolution. After that, a moving image can be captured with appropriate exposure at QVGA and 30 frames/sec by the pixel addition process upon returning to the first mode for every predetermined time. With this control, the features of the suspicious person can be captured at a high probability.

According to the above-described embodiment, it is possible to appropriately control the relationship between the electronic zoom magnification and the resolution of a displayed image in electronic zoom.

Other Embodiments

The object of the embodiment is achieved even by the following method. That is, a storage medium (or recording medium) which records software program codes for implementing the functions of the above-described embodiment is supplied to the system or apparatus. The computer (or CPU or MPU) of the system or apparatus reads out and executes the program codes stored in the storage medium. In this case, the program codes read out from the storage medium implement the functions of the above-described embodiment by themselves, and the storage medium which stores the program codes constitutes the present invention. In addition to the case in which the functions of the above-described embodiment are implemented when the computer executes the readout program codes, the present invention incorporates the following case. That is, the functions of the above-described embodiment are implemented when the operating system (OS) running on the computer performs part or all of actual processing based on the instructions of the program codes.

The present invention also incorporates the following case. That is, the program codes read out from the storage medium are written in the memory of a function expansion card inserted into the computer or a function expansion unit connected to the computer. After that, the functions of the above-described embodiment are implemented when the CPU of the function expansion card or function expansion unit performs part or all of actual processing based on the instructions of the program codes.

When the present invention is applied to the storage medium, it stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-322525, filed Nov. 29, 2006, which is hereby incorporated by reference herein in its entirety.

What is claimed is:

1. An image capturing apparatus comprising:
   an image sensor which photo-electrically converts an image of an image sensing field formed by a photographing optical system;
   an extracting unit which extracts a part of the video image generated upon being photo-electrically converted by said image sensor;
   an adding unit which adds signals of respective pixels, the number of which corresponds to a luminance of the image sensing field, of a plurality of pixels of said image sensor; and
   a limiting unit which limits an extraction range of the video image extracted by said extracting unit, in accordance with the number of pixels added by said adding unit.

2. The apparatus according to claim 1, wherein said extracting unit further comprises a warning unit which issues a warning when said extracting unit extracts a video image which falls outside the extraction range of the video image limited by said limiting unit.

3. The apparatus according to claim 1, wherein said extracting unit further comprises a change unit which changes a frame rate at which said image capturing apparatus captures a moving image when said extracting unit extracts a video image which falls outside the extraction range of the video image limited by said limiting unit.

4. The apparatus according to claim 1, further comprising:
   a determining unit which determines movement of an object in the image sensing field; and
   a control unit which controls said extracting unit to move a position of the video image extracted by said extracting unit, in synchronism with movement of the object.

5. A method of controlling an image capturing apparatus including an image sensor which photo-electrically converts an image of an image sensing field formed by a photographing optical system, the method comprising:
   an extracting step of extracting a part of the video image generated upon being photo-electrically converted by the image sensor;
   an adding step of adding signals of respective pixels, the number of which corresponds to a luminance of the image sensing field, of a plurality of pixels of the image sensor; and
   a limiting step of limiting an extraction range of the video image extracted in the extracting step, in accordance with the number of pixels added in the adding step.

* * * * *